US012288034B2

(12) United States Patent
Mohanty et al.

(10) Patent No.: US 12,288,034 B2
(45) Date of Patent: Apr. 29, 2025

(54) AUTOMATICALLY SUMMARIZING EVENT-RELATED DATA USING ARTIFICIAL INTELLIGENCE TECHNIQUES

(71) Applicant: Dell Products L.P., Round Rock, TX (US)

(72) Inventors: Bijan Kumar Mohanty, Austin, TX (US); Gregory Michael Ramsey, Seattle, WA (US); Hung T. Dinh, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 323 days.

(21) Appl. No.: 17/874,755

(22) Filed: Jul. 27, 2022

(65) Prior Publication Data

US 2024/0037316 A1 Feb. 1, 2024

(51) Int. Cl.
| | | |
|---|---|---|
| *G06F 40/30* | (2020.01) | |
| *G06F 40/10* | (2020.01) | |
| *G06F 40/279* | (2020.01) | |
| *G06F 40/58* | (2020.01) | |
| *G06N 3/08* | (2023.01) | |
| *G10L 13/02* | (2013.01) | |

(52) U.S. Cl.
CPC .............. *G06F 40/30* (2020.01); *G06F 40/10* (2020.01); *G06F 40/279* (2020.01); *G06F 40/58* (2020.01); *G06N 3/08* (2013.01); *G10L 13/02* (2013.01)

(58) Field of Classification Search
None
See application file for complete search history.

(56) References Cited

U.S. PATENT DOCUMENTS 9,641,563 B1 * 5/2017 Kitada ............... G06Q 10/1095
9,672,291 B2 * 6/2017 Aharony ............. G06F 16/9535
(Continued)

OTHER PUBLICATIONS

Zhu, Chenguang, et al. "A hierarchical network for abstractive meeting summarization with cross-domain pretraining." arXiv preprint arXiv:2004.02016 (2020). (Year: 2020).*

(Continued)

*Primary Examiner* — Douglas Godbold
(74) *Attorney, Agent, or Firm* — Ryan, Mason & Lewis, LLP

(57) ABSTRACT

Methods, apparatus, and processor-readable storage media for automatically summarizing event-related data using artificial intelligence techniques are provided herein. An example computer-implemented method includes obtaining text-based data and non-text-based data associated with at least one virtual event comprising one or more participants; generating a content-related summarization of one or more of at least a portion of the text-based data and at least a portion of the non-text-based data using at least a first set of one or more artificial intelligence techniques; generating a participant sentiment-related summarization associated with one or more of at least a portion of the text-based data and at least a portion of the non-text-based data using at least a second set of one or more artificial intelligence techniques; and performing one or more automated actions based at least in part on one or more of the content-related summarization and the participant sentiment-related summarization.

20 Claims, 16 Drawing Sheets

(56) References Cited

U.S. PATENT DOCUMENTS

| | | | |
|---|---|---|---|
| 10,275,420 B2 | 4/2019 | Aharony et al. | |
| 10,846,535 B2* | 11/2020 | Leppänen | G06F 16/74 |
| 11,080,356 B1* | 8/2021 | Kumar | G06F 16/9577 |
| 11,122,341 B1* | 9/2021 | Decrop | H04N 21/44008 |
| 11,397,892 B2* | 7/2022 | Subramanian | G06N 3/045 |
| 11,620,320 B1* | 4/2023 | Shukla | G06F 40/30 707/692 |
| 11,681,876 B2* | 6/2023 | Baughman | G06N 3/006 704/9 |
| 11,783,112 B1* | 10/2023 | Fan | G06F 16/345 715/234 |
| 11,853,706 B2* | 12/2023 | Hosseini-Asl | G06N 3/096 |
| 11,985,180 B2* | 5/2024 | Tiwari | H04L 12/1831 |
| 2012/0290289 A1* | 11/2012 | Manera | G06F 40/30 704/9 |
| 2019/0341050 A1* | 11/2019 | Diamant | G06V 40/172 |
| 2019/0349321 A1* | 11/2019 | Cai | G06N 3/006 |
| 2019/0384813 A1* | 12/2019 | Mahmoud | G06F 40/289 |
| 2020/0160278 A1* | 5/2020 | Allen | G06Q 10/1095 |
| 2020/0228358 A1 | 7/2020 | Rampton | |
| 2020/0242151 A1* | 7/2020 | Adlersberg | G06F 16/483 |
| 2020/0258525 A1* | 8/2020 | McQuiston | G06Q 10/109 |
| 2020/0342895 A1* | 10/2020 | Jung | G10L 15/26 |
| 2020/0403817 A1* | 12/2020 | Daredia | G06F 16/438 |
| 2021/0256221 A1* | 8/2021 | Beaugh | G06N 3/088 |
| 2022/0067385 A1* | 3/2022 | Kaushik | G06N 3/044 |
| 2022/0230641 A1* | 7/2022 | Do | G10L 15/02 |
| 2022/0253605 A1* | 8/2022 | Tan | G06Q 10/1095 |
| 2022/0284196 A1* | 9/2022 | Alonso Garcia | G06F 40/58 |
| 2022/0366145 A1* | 11/2022 | Hosseini-Asl | G06F 40/284 |
| 2023/0007063 A1* | 1/2023 | Gupta | H04L 65/1069 |
| 2023/0297765 A1* | 9/2023 | Vendrow | G10L 15/1815 704/251 |
| 2023/0401384 A1* | 12/2023 | Sawayama | G06F 40/47 |
| 2024/0005085 A1* | 1/2024 | Kukde | G10L 25/78 |

OTHER PUBLICATIONS

Singhal, Daksha, et al. "Abstractive summarization of meeting conversations." 2020 IEEE International Conference for Innovation in Technology (INOCON). IEEE, 2020. (Year: 2020).*

Qin, Xugong, et al. "Mask is all you need: Rethinking mask R-CNN for dense and arbitrary-shaped scene text detection." Proceedings of the 29th ACM International Conference on Multimedia. 2021. (Year: 2021).*

Vaswani et al., Attention is All You Need, arXiv:1706.03762, Jun. 12, 2017.

* cited by examiner

```
# importing libraries
import speech_recognition as sr
import os
from pydub import AudioSegment
from pydub.silence import split_on_silence create a speech recognition object
recognizer = sr.Recognizer()

# a function that splits the audio file into chunks
# and applies speech recognition
def get_large_audio_transcription(path):
    """
    Split the large audio file into chunks
    and apply speech recognition on each of these chunks
    """
    # open the audio file using pydub
    sound = AudioSegment.from_wav(path)
    # split audio sound where silence is 700 milliseconds or more and get chunks
    chunks = split_on_silence(sound,
        # experiment with this value for your target audio file
        min_silence_len = 500,
        # adjust this per requirement
        silence_thresh = sound.dBFS-14,
        # keep the silence for 1 second, adjustable as well
        keep_silence=500,
    )
    folder_name = "audio-chunks"
    # create a directory to store the audio chunks
    if not os.path.isdir(folder_name):
        os.mkdir(folder_name)

whole_text = ""

# process each chunk
```

FIG. 5

```
#First Conv1D layer
conv = Conv1D(8, 13, padding='valid', activation='relu', strides=1) (inputs)
conv = MaxPooling1D(3) (conv)
conv = Dropout(0.3) (conv)

#Second Conv1D layer
conv = Conv1D(16, 11, padding='valid', activation='relu', strides=1) (conv)
conv = MaxPooling1D(3) (conv)
conv = Dropout(0.3) (conv)

#Third Conv1D layer
conv = Conv1D(32, 9, padding='valid', activation='relu', strides=1) (conv)
conv = MaxPooling1D(3) (conv)
conv = Dropout(0.3) (conv)

#Fourth Conv1D layer
conv = Conv1D(64, 7, padding='valid', activation='relu', strides=1) (conv)
conv = MaxPooling1D(3) (conv)
conv = Dropout(0.3) (conv)

#Flatten layer
conv = Flatten() (conv)

#Dense Layer 1
conv = Dense(256, activation='relu') (conv)
conv = Dropout(0.3) (conv)

#Dense Layer 2
conv = Dense(128, activation='relu') (conv)
conv = Dropout(0.3) (conv)

outputs = Dense(len(labels), activation='softmax') (conv)
```

FIG. 8

```
from gtts import gTTS language = 'en'
speech = gTTS(text = str(file), lang = language, slow = False)
speech.save("audio.mp3")
```

```
from pyttsx3 play audio instantly by converting text to speech
engine = pyttsx3.init('sapi5')
engine.say(text)
engine.runAndWait()

# Save audio to file
engine.save_to_file(text, 'audio.mp3')
engine.runAndWait()
```

```
import pytesseract
pytesseract.pytesseract.tesseract_cmd = r'C:\python\Tesseract-OCR\tesseract'
print(pytesseract.image_to_string(r'D:\python\data\bsodImage.png'))
```

AUTOMATICALLY SUMMARIZING EVENT-RELATED DATA USING ARTIFICIAL INTELLIGENCE TECHNIQUES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The field relates generally to information processing systems, and more particularly to techniques for processing data using such systems.

BACKGROUND

Virtual events are increasingly important tools enterprises use for active collaborations and meetings with various participants. As such events have become more frequently utilized, participants and/or other individuals often have conflicts which preclude them from attending at least portions of particular conferences or other virtual events. Conventional event management approaches typically record such events and make the recordings available for offline playback. However, such approaches commonly require individuals to view and/or listen to the entire duration of the event recording to gather potentially useful information, which can be disadvantageous as many events provide sought-after information mixed with noise and/or less relevant discussions. As such, a time-intensive and/or resource-intensive review of the entire event recording is often needed.

SUMMARY

Illustrative embodiments of the disclosure provide techniques for automatically summarizing event-related data using artificial intelligence techniques. An exemplary computer-implemented method includes obtaining text-based data and non-text-based data associated with at least one virtual event comprising one or more participants, and generating a content-related summarization of one or more of at least a portion of the text-based data and at least a portion of the non-text-based data using at least a first set of one or more artificial intelligence techniques. The method also includes generating a participant sentiment-related summarization associated with one or more of at least a portion of the text-based data and at least a portion of the non-text-based data using at least a second set of one or more artificial intelligence techniques. Further, the method includes performing one or more automated actions based at least in part on one or more of the content-related summarization and the participant sentiment-related summarization.

Illustrative embodiments can provide significant advantages relative to conventional event management approaches. For example, problems associated with time-intensive and/or resource-intensive reviews of entire event recordings are overcome in one or more embodiments through automatically summarizing various forms of event-related data using artificial intelligence techniques.

These and other illustrative embodiments described herein include, without limitation, methods, apparatus, systems, and computer program products comprising processor-readable storage media.

BRIEF DESCRIPTION OF THE DRAWINGS

FIG. 5 shows example pseudocode for converting audio data to text data in an illustrative embodiment.

FIG. 8 shows example pseudocode for implementing a Conv1d model for performing speech data to text data conversion in an illustrative embodiment.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
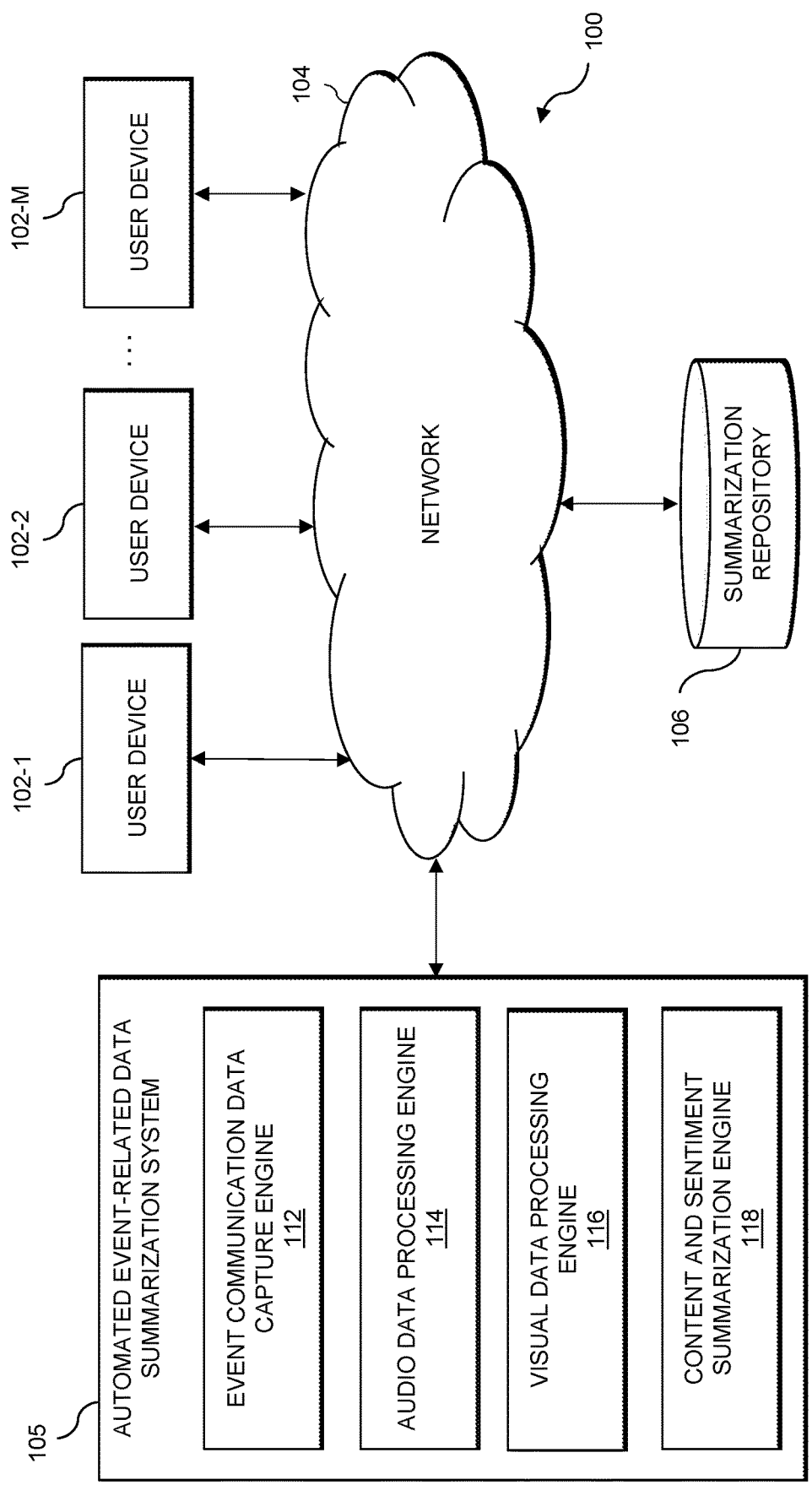
FIG. 1 shows an information processing system configured for automatically summarizing event-related data using artificial intelligence techniques in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is automated event-related data summarization system 105.

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, automated event-related data summarization system 105 can have an associated summarization repository 106 configured to store data pertaining to summarized content associated with one or more given events, which can comprise, for example, summarized text content, summarized audio content, translated text and/or audio content in one or more languages, metadata pertaining to the one or more given events, etc. By way of example, in one or more embodiments, summarization repository 106 is responsible for storing summarized content in textual form as well as one or more textualized versions of shared presentation image data from a given event (e.g., a virtual event such as a conference, webinar, or other remote and/or telecommunications-based meeting, gathering, discussion, etc.). If the summarized content is converted into one or more different languages, such text and/or audio versions can also be stored in summarization repository 106. In at least one example embodiment, text-based content can be stored on a relational database and/or a NoSQL database (e.g., as a blob format), while audio-based content can be stored in a NoSQL database and/or related metadata and audio file path information can be stored in a relational database.

The summarization repository 106 in the present embodiment is implemented using one or more storage systems associated with automated event-related data summarization system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with automated event-related data summarization system 105 are one or more input-output devices, which illustratively comprise keyboards, displays or other types of input-output devices in any combination. Such input-output devices can be used, for example, to support one or more user interfaces to automated event-related data summarization system 105, as well as to support communication between automated event-related data summarization system 105 and other related systems and devices not explicitly shown.

Additionally, automated event-related data summarization system 105 in the FIG. 1 embodiment is assumed to be implemented using at least one processing device. Each such processing device generally comprises at least one processor and an associated memory, and implements one or more functional modules for controlling certain features of automated event-related data summarization system 105.

More particularly, automated event-related data summarization system 105 in this embodiment can comprise a processor coupled to a memory and a network interface.

The processor illustratively comprises a microprocessor, a central processing unit (CPU), a graphics processing unit (GPU), a tensor processing unit (TPU), a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows automated event-related data summarization system 105 to communicate over the network 104 with the user devices 102, and illustratively comprises one or more conventional transceivers.

The automated event-related data summarization system 105 further comprises an event communication data capture engine 112, an audio data processing engine 114, a visual data processing engine 116, and a content and sentiment summarization engine 118.

It is to be appreciated that this particular arrangement of elements 112, 114, 116 and 118 illustrated in the automated event-related data summarization system 105 of the FIG. 1 embodiment is presented by way of example only, and alternative arrangements can be used in other embodiments. For example, the functionality associated with elements 112, 114, 116 and 118 in other embodiments can be combined into a single module, or separated across a larger number of modules. As another example, multiple distinct processors can be used to implement different ones of elements 112, 114, 116 and 118 or portions thereof.

At least portions of elements 112, 114, 116 and 118 may be implemented at least in part in the form of software that is stored in memory and executed by a processor.

It is to be understood that the particular set of elements shown in FIG. 1 for automatically summarizing event-related data using artificial intelligence techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components. For example, in at least one embodiment, automated event-related data summarization system 105 and summarization repository 106 can be on and/or part of the same processing platform.

An exemplary process utilizing elements 112, 114, 116 and 118 of an example automated event-related data summarization system 105 in computer network 100 will be described in more detail with reference to the flow diagram of FIG. 14.

Accordingly, at least one embodiment includes implementing an intelligent virtual event assistant framework for generating summarized content for expeditious messaging. As further detailed herein, one or more embodiments include leveraging artificial intelligence techniques such as, for example, natural language processing (NLP) techniques and/or computer vision techniques, to build a virtual event assistant framework to provide summarized content of the event with contextual metadata to convey comprehensive and/or salient information associated with the event to one or more users. As used herein, a summary or summarized content is to be construed as a synopsis of at least a portion of content (e.g., a discussion or conversation from a virtual event), conveying one or more key aspects of the content in a more concise manner.

Such an embodiment includes capturing at least portions of the virtual event (e.g., in stealth mode) including transcripts, participant information (e.g., identification of all participants, active participants, etc.), questions raised and answered, and one or more items of metadata. Additionally, such an embodiment includes generating summarized content from and/or associated with the event, including the topic(s) being discussed, outcomes, etc., as well as determining and outputting intent and sentiment analysis from at least a portion of conversational context from at least one domain-specific corpus of related topics.

At least one embodiment can also include scanning at least a portion of any presentation materials (e.g., slides, tables, documents, etc.) from video input(s) and providing at least one textual representation of the materials. One or more embodiments include implementing multilingual and multimodal communication techniques in at least one secure manner (e.g., text-to-speech, speech-to-text, etc.). Such an embodiment can also include implementing a playback and/or read-aloud of at least a portion of the summarized content for passive consumption.

Figure 2:
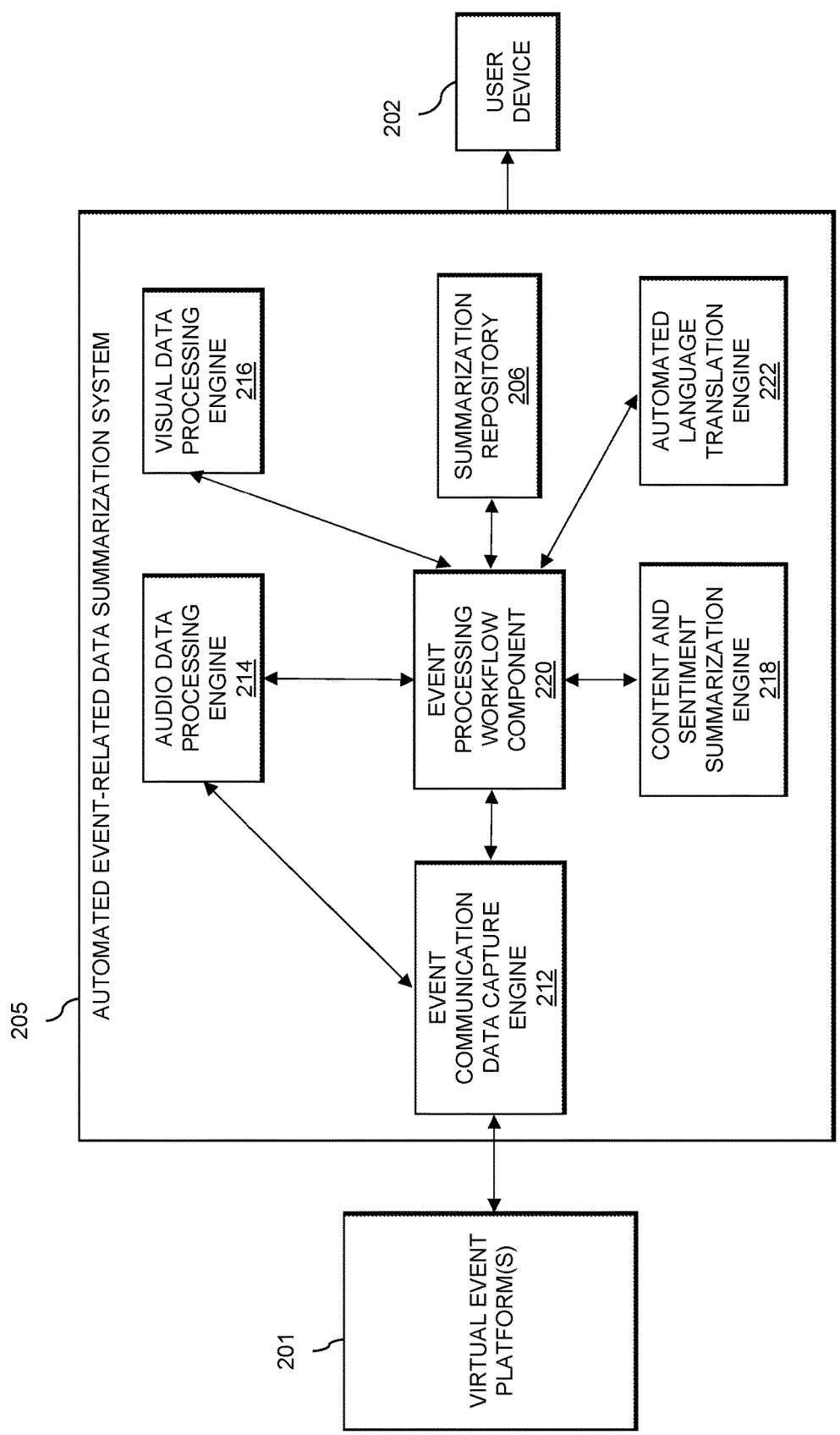
FIG. 2 shows example system architecture in an illustrative embodiment.

FIG. 2 shows example system architecture in an illustrative embodiment. By way of illustration, FIG. 2 depicts one or more virtual event platforms 201 outputting and/or providing data to automated event-related data summarization system 205, which produces one or more summarization outputs to user device 202. More specifically, as depicted in FIG. 2, automated event-related data summarization system 205 includes event communication data capture engine 212, which captures conversation data, audio data, image data and/or video data from the virtual event platform(s) 201 (e.g., in connection with a particular event) in stealth mode using, e.g., screen recording techniques. After obtaining such data, for example, in text or audio/video format, event communication data capture engine 212 utilizes audio processing capability that uses speech-to-text conversion techniques for converting at least a portion of the data into natural language text for processing using NLP techniques for topic and/or intent analysis, sentiment classification, and content summarization. Additionally or alternatively, one or more embodiments can include implementing speech-to-text conversion techniques including Pydub, an open-source Python library to convert audio to text, and/or at least one neural network with libRosa and SciPy libraries.

Also, in at least one embodiment, content and sentiment summarization engine 218 implements one or more NLP techniques to summarize at least a portion of conversation text while maintaining one or more items of context-related information. NLP techniques can also be implemented to identify the intent(s) and/or topic(s) of the conversation, as well as participant sentiment(s) pertaining to the conversation via processing tasks such as, for example, grammar cloning, rule filtering, searching, grammar pruning, processing, restriction filtering, etc.

As also depicted in FIG. 2, visual data processing engine 216 processes image and/or video data, for example, to convert images displaying presentation slides into at least one textual representation using segmentation techniques and/or optical character recognition (OCR) techniques (e.g., for extracting text in the slide(s) and/or file(s) presented) for reading and/or listening by one or more users. Additionally, audio data processing engine 214 processes (leveraging, for example, one or more recurrent neural networks (RNNs), one or more long short-term memory (LSTM) models, one or more open source python libraries, etc.) audio data to, for example, initially convert speech data (e.g., conversation data from the given event) to text data, and subsequently convert text data (e.g., summarized text data) to audio and/or speech data (e.g., for on-demand playback).

FIG. 2 also depicts summarization repository 206, which enables native store and retrieval of summarized content text data and summarized content audio data for playback (read-aloud), as well as other metadata associated with the event including, for example, date information, participant information, topic-related information, sentiment-related information, presentation text, etc. Additionally, as depicted in FIG. 2, automated language translation engine 222 can be used in one or more embodiments to convert the summarized text (generated by content and sentiment summarization engine 218 and transmitted via event processing workflow component 220) to at least one language of choice (e.g., a local language preference) of the given user(s). In such an embodiment, automated language translation engine 222 utilizes one or more NLP algorithms and/or artificial intelligence-based language translation algorithms to translate the summarized text into one or more languages for use and/or consumption by one or more users for reading (e.g., offline reading) and/or read-aloud audio format(s).

As noted above, in one or more embodiments, data pertaining to and/or derived from virtual event contents are captured by event communication data capture engine 212 as one or more screen recordings as well as one or more transcripts being passed from the virtual event platform(s) 201. Screen recordings can capture audio data and video data that can then be used, for example, by audio data processing engine 214 and/or visual data processing engine 216 for conversion to text content to be passed to the event processing workflow component 220. In at least one embodiment, the event processing workflow component 220 passes output provided by audio data processing engine 214 and/or visual data processing engine 216 to the content and sentiment summarization engine 218, which uses at least a portion of such output(s) to classify the sentiment of the event and summarize the textual data into a configurable size of summarized content while maintaining one or more items of context-related information intact. In connection with NLP techniques, the context of a conversation can be maintained, for example, by utilizing enterprise-related corpus data. In one or more embodiments, such text summarization considers the domain language(s) relevant to the event to understand the context and intent of the messages to generate the natural language output(s), which is a reduced version of the original content. Such actions can be achieved, for example, by training at least a portion of the content and sentiment summarization engine 218 using at least one domain-specific corpus of the given enterprise(s) and at least one generic corpus.

As also depicted in FIG. 2, summarized text data, audio data and/or image data are stored in the summarization repository 206. Depending on the locale and/or the language (s) of choice by the user(s), at least a portion of the summarized text can be translated into one or more other languages using automated language translation engine 222 and stored along with the original summarization text data. The summarized text content can also be converted to one or more audio formats by audio data processing engine 214 by leveraging one or more text-to-speech techniques. In such an embodiment, at least one link to such audio data in the summarization repository 206 can be output along with at least a portion of the summarization text to user device 202 for on-demand consumption and/or read-aloud audio consumption.

In one or more embodiments, sentiment classification and content summarization are carried out using one or more NLP techniques that can be achieved using at least one transformer. In such an embodiment, summarization can be achieved by using at least one extractive approach and/or at least one abstractive approach. Extractive summarization refers to a technique that involves the extraction of one or more words and/or phrases (e.g., one or more important words and/or phrases as designated by at least one user and/or pre-programmed into the summarization technique) from one or more input sentences. In at least one embodiment, extractive text summarization can be performed by selecting one or more important sentences from the original text in a matter that forms the final summary. Such an embodiment can include selecting important sentences, for example, by identifying the top N sentences that best represent the summary of the content with respect to relevance (e.g., using at least one transformer trained with corpus data for context).

Abstractive summarization refers to a technique involving the generation of one or more entirely new words and/or phrases that capture the meaning of the input sentence. Such a technique includes putting an emphasis on a grammatical summary, thereby requiring advanced language modeling techniques for natural language generation (NLG) such as, for example, named entity recognition (NER) in order to extract named entities, concepts and/or senses from original text, a sequence2sequence deep learning model of an attentive encoder-decoder architecture to generate generalized text and/or context-specific text by training the model with relevant corpus data, etc.

Accordingly, one or more embodiments include adopting at least one abstractive summarization technique to generate a summary by rephrasing and/or using new words (i.e., words that are not present in the input) while maintaining the meaning of the input text. Such an embodiment can include leveraging artificial intelligence-based transformers, which can include, for example, a bidirectional encoder representation from transformers (BERT), a generative pretrained transformer (GPT), generative pretrained transformer 3 (GPT3), and/or a Huggingface transformer (e.g., a community-based transformer for Python to achieve various NLP tasks).

Transformers, as further detailed in connection with FIG. 3, include architecture to solve sequence-to-sequence data issues while handling one or more long-range data issues. Because conversation content in natural language includes a sequence of words in text form, and an output summary is also a sequence of words, one or more transformers can be modeled to solve a many-to-many sequence-to-sequence problem.

Figure 3:
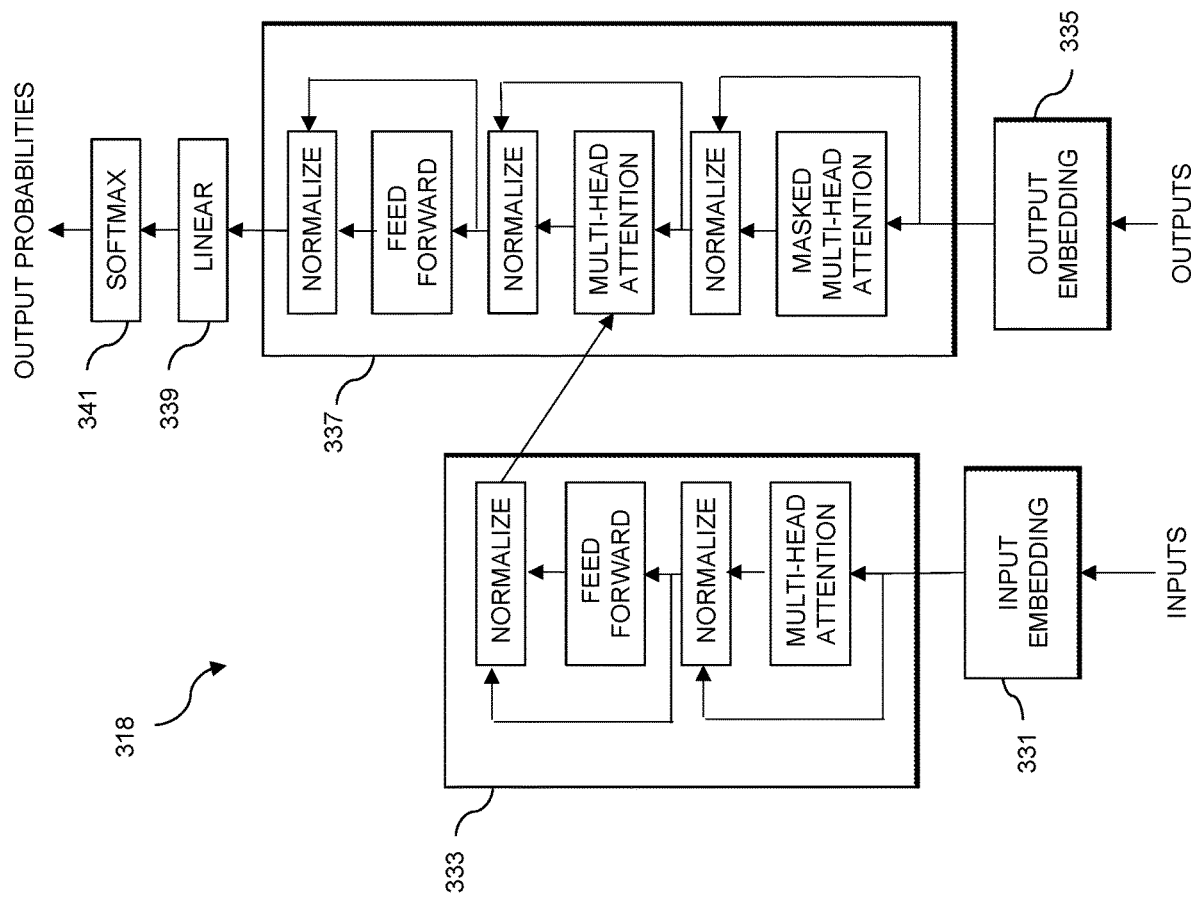
FIG. 3 shows an architecture of an example transformer in an illustrative embodiment.

FIG. 3 shows an architecture of an example transformer 318 in an illustrative embodiment. By way of illustration, FIG. 3 depicts a many-to-many sequence-to-sequence modelled transformer 318, which has two core building blocks in the form of encoder 333 and decoder 337 with supporting capabilities referred to as attention mechanisms. Utilizing an encoder-decoder architecture facilitates solving sequence-to-sequence problems such as text summarization wherein input and output sequences are of different lengths. As depicted in the example transformer 318 of FIG. 3, encoder 333, which processes (e.g., using positional encoding) inputs via an input embedding component 331, includes a stack of N identical layers wherein each layer is composed of two sub-layers (e.g., a multi-head attention layer with layer normalization, and a feed forward layer with layer normalization). The decoder 337, which processes (e.g., using positional encoding) outputs via an output embedding component 335, includes a stack of N identical layers wherein each layer is composed of three sub-layers (e.g., a masked multi-head attention layer with layer normalization, a multi-head attention layer with layer normalization, and a feed forward layer with layer normalization). Outputs generated by the decoder 337 are then processed by a linear layer 339 and a softmax layer 341 to determine one or more output probabilities.

At least one embodiment includes utilizing a Huggingface transformer, which uses pre-trained models capable of summarization and/or other NLP tasks including sentiment classification. Huggingface, as noted herein, is a community-based Python library which is available to work with PyTorch and TensorFlow. At least a portion of the pre-trained models used by a Huggingface transformer are trained using community data (e.g., online data sources, social media data sources, etc.). Also, considering event conversations commonly involve domain-specific context, transformer models used by one or more embodiments (e.g., a Huggingface transformer) can be customized and/or retrained with domain-specific data.

Accordingly, in one or more embodiments, a Huggingface transformer with one or more pretrained models is used to determine the intent(s) and topic(s) being discussed during at least a portion of the event by processing a transcript of the conversation. In one or more embodiments, at least one integrated development environment can be implemented to develop at least one topic analyzer, at least one content summarizer, and at least one sentiment classifier using at least one Huggingface transformer. For example, a Huggingface model trained with conversation summary data can be used to create a topic analyzer by using at least one pipeline function. In at least one embodiment, different models can be used to summarize conversation content, resulting in different predicted results, with a selection among the different results being subsequently made based, for example, on one or more accuracy parameters.

Figure 4:
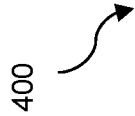
FIG. 4 shows example pseudocode for implementing a sentiment classifier model in an illustrative embodiment.

FIG. 4 shows example pseudocode for implementing a sentiment classifier model in an illustrative embodiment. In this embodiment, example pseudocode 400 is executed by or under the control of at least one processing system and/or device. For example, the example pseudocode 400 may be viewed as comprising a portion of a software implementation of at least part of automated event-related data summarization system 105 of the FIG. 1 embodiment.

The example pseudocode 400 illustrates a sentiment classifier model created using a Huggingface transformer pipeline that uses a distilBERT model and predicted the sentiment of the given conversation as negative based on processing of the conversation transcript. In one or more embodiments, in the case of a customized model trained with domain data, the model can be passed as input to the pipeline function instead of using the default distilBERT model.

It is to be appreciated that this particular example pseudocode shows just one example implementation of a sentiment classifier model, and alternative implementations of the process can be used in other embodiments.

FIG. 5 shows example pseudocode for converting audio data to text data in an illustrative embodiment. In this embodiment, example pseudocode 500 is executed by or under the control of at least one processing system and/or device. For example, the example pseudocode 500 may be viewed as comprising a portion of a software implementation of at least part of automated event-related data summarization system 105 of the FIG. 1 embodiment.

The example pseudocode 500 illustrates techniques for converting audio data to text data using Pydub. Specifically, a large audio file is split into multiple chunks, and each chunk is then converted into text (and optionally appended with other converted chunks) and returned.

It is to be appreciated that this particular example pseudocode shows just one example implementation of converting audio data to text data, and alternative implementations of the process can be used in other embodiments.

One or more embodiments assume that audio messages are received in digital signal format. However, if the audio messages are in analog format, the signal is converted into a digital format, wherein the sampling rate or sampling frequency is defined as the number of samples selected per second.

Additionally, in at least one embodiment, speech recognition includes extracting at least one feature from the voice signal, wherein the at least one feature will subsequently be input to the speech recognition model. Such feature extraction can be carried out using techniques including time-domain analysis and frequency domain analysis. Using time-domain analysis, the audio signal is represented by the amplitude as a function of time. Using frequency domain analysis, a plot between frequency and amplitude is used. To represent features between frequency and time, one or more embodiments includes plotting a spectrograph.

One or more embodiments includes utilizing TensorFlow, which provides a speech commands dataset that can include, for example, one-second long utterances of multiple words spoken by multiple people. Such a dataset can be used as training data for a speech-to-text model, and libRosa and SciPy libraries can be used for audio processing in Python. Additionally, at least one embodiment includes using at least one neural network for feature learning and predicting conversions of audio data to text data. A speech-to-text model in such an embodiment can use, for example, a one-dimension convolutional neural network referred to as Conv1d, available in TensorFlow and Keras. With such a neural network model, there are four layers of a convolutional neural network such as Conv1d, and max pooling is used, as further detailed in connection with FIG. 6.

Figure 6:
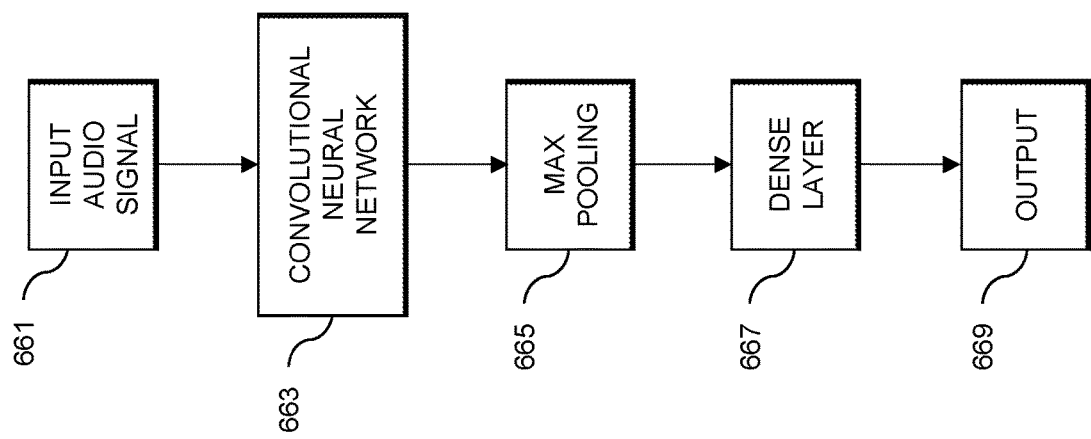
FIG. 6 shows an example workflow of a convolutional neural network in an illustrative embodiment.

FIG. 6 shows an example workflow of a convolutional neural network in an illustrative embodiment. By way of illustration, input audio signal 661, which can be preprocessed by sampling and removing any speech less than a given duration (e.g., one second), is processed by a convolutional neural network (e.g., a Conv1d model) in step 663. For a multi-classification use case, the target value labels (which are categorical data) are encoded by LabelEncoder (with classes available in a ScikitLearn library). As part of step 663, the input audio signal 661 is partitioned into a training dataset (e.g., 80% of the data) and a testing dataset (20% of the data), whereby the convolutional neural network can be trained with the training dataset. Additionally, the convolutional neural network includes four convolutional layers using a rectified linear unit (ReLU) as the activation function, and an output layer using softmax as the activation function.

In connection with the example embodiment depicted in connection with FIG. 6, a speech-to-text component can be implemented which uses a one-dimensional convolutional neural network such as Conv1d. In such an architecture, four layers of Conv1d (as shown via step 663) and max pooling (as shown via step 665) are used. The Conv1D layers create a convolution kernel that deals with one dimension, meaning it convolves with the layer input over a single spatial or temporal dimension. The max pooling layer, implemented in step 665, is used after the convolution layers for ordering layers within a convolutional neural network that may be repeated multiple times (e.g., 4 times). Max pooling, as used herein, refers to a type of pooling layer which uses the maximum value of each patch of a given feature map. Subsequent to the implementation of the max pooling layer in step 665, step 667 includes utilizing a dense layer to classify the speech based on the output(s) from the convolutional neural network layers in step 663 and/or the max pooling layer in step 665, and based at least in part on this classification, an output 669 is generated.

In one or more embodiments, categorical cross-entropy can be used as the loss function (with respect to error or the difference between the predicted value and the actual value) of a neural network model such as detailed in connection with FIG. 6, and an Adam optimizer can be used by the neural network model.

Figure 7:
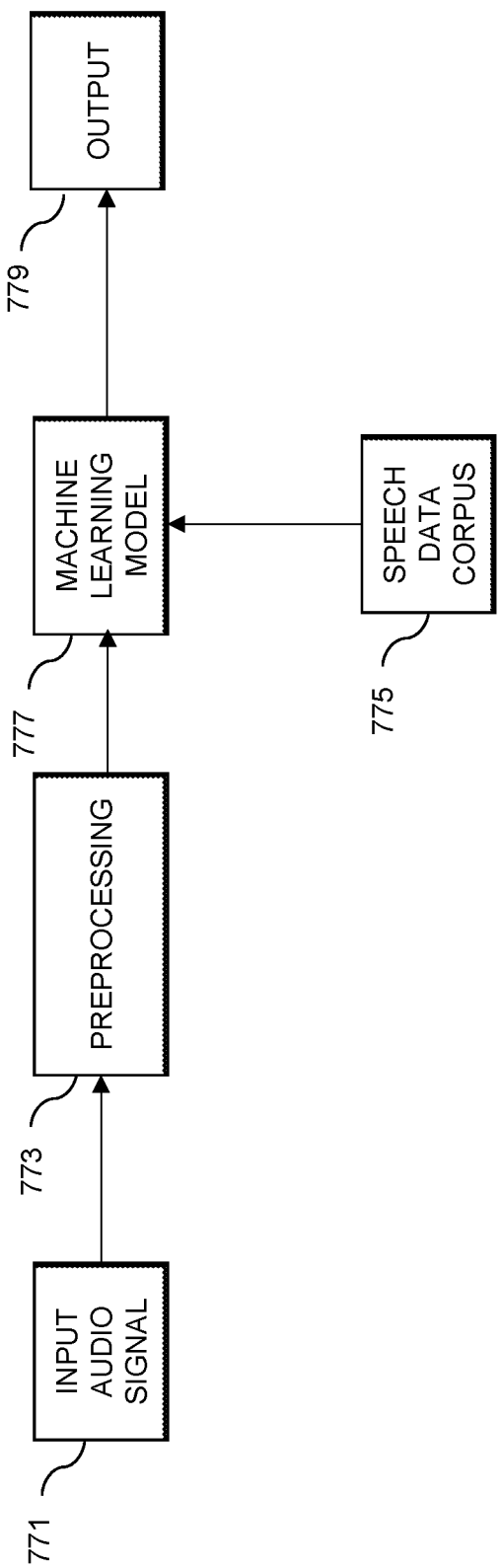
FIG. 7 shows an example workflow of a convolutional neural network in an illustrative embodiment.

FIG. 7 shows an example workflow of a convolutional neural network in an illustrative embodiment. By way of illustration, FIG. 7 depicts input audio signal 771, preprocessed in step 773, being processed by machine learning model 777 (e.g., Conv1d), which is trained using speech data corpus 775. Based on the processing of input audio signal 771, machine learning model 777 generates an output 779 (e.g., in the form of a text message to at least one given user) representing the prediction of the speech-to-text conversion of input audio signal 771.

FIG. 8 shows example pseudocode for implementing a Conv1d model for performing speech data to text data conversion in an illustrative embodiment. In this embodiment, example pseudocode 800 is executed by or under the control of at least one processing system and/or device. For example, the example pseudocode 800 may be viewed as comprising a portion of a software implementation of at least part of automated event-related data summarization system 105 of the FIG. 1 embodiment.

The example pseudocode 800 illustrates configuring various layers of a Conv1d model, including a first Conv1d layer, a second Conv1d layer, a third Conv1d layer, a fourth Conv1d layer, a flatten layer, a first dense layer and a second dense layer. Example pseudocode 800 also illustrates outputs, which includes the use of a softmax activation function. An example embodiment, such as depicted in FIG. 8, can include using Keras, a TensorFlow backend, and libRosa and SciPy libraries.

It is to be appreciated that this particular example pseudocode shows just one example implementation of a Conv1d model for performing speech data to text data conversion, and alternative implementations of the process can be used in other embodiments.

As also detailed herein, one or more embodiments include using text-to-speech techniques for converting summarized text for audio playback by one or more users. As further described in connection with FIG. 9, multiple open-source libraries such as Google Text-to-Speech (GTTS) library and pyttsx3 (a text-to-speech library for python) can be implemented by such an embodiment, wherein such a library can be installed in a local python environment using a pip install command.

Figure 9:
FIG. 9 shows example pseudocode for implementing text-to-speech techniques in an illustrative embodiment.

FIG. 9 shows example pseudocode for implementing text-to-speech techniques in an illustrative embodiment. In this embodiment, example pseudocode 900 is executed by or under the control of at least one processing system and/or device. For example, the example pseudocode 900 may be viewed as comprising a portion of a software implementation of at least part of automated event-related data summarization system 105 of the FIG. 1 embodiment.

The example pseudocode 900 illustrates implementing GTTS text-to-speech techniques by importing the library and gTTS function, and then passing the given input text (e.g., event summarization text) to be converted and the selected and/or identified language of the text. The resulting voice data can be saved, for example, as one or more mp3 files for later playback in an audio repository with the proper access control for authentication and authorization. A related read-aloud engine can also be implemented in connection with the GTTS library.

It is to be appreciated that this particular example pseudocode shows just one example implementation of text-to-speech techniques, and alternative implementations of the process can be used in other embodiments.

Figure 10:
FIG. 10 shows example pseudocode for implementing text-to-speech techniques in an illustrative embodiment.

FIG. 10 shows example pseudocode for implementing text-to-speech techniques in an illustrative embodiment. In this embodiment, example pseudocode 1000 is executed by or under the control of at least one processing system and/or device. For example, the example pseudocode 1000 may be viewed as comprising a portion of a software implementation of at least part of automated event-related data summarization system 105 of the FIG. 1 embodiment.

The example pseudocode 1000 illustrates implementing Pyttsx3 text-to-speech techniques by importing the library and say( ) function, and then passing the given input text (e.g., event summarization text) to be converted. The resulting voice data can be saved, for example, as mp3 files for later playback in an audio repository with the proper access control for authentication and authorization. A related read-aloud engine can also be implemented in connection with the pyttsx3 text-to-speech library.

It is to be appreciated that this particular example pseudocode shows just one example implementation of text-to-speech techniques, and alternative implementations of the process can be used in other embodiments.

In one or more embodiments, summarized content, with one or more audio files, can be created based at least in part on language needs, and stored in a central audio repository for management and playback. In such an embodiment, the audio file(s) can be access-controlled based, for example, on user identity and user authorization status.

Figure 11:
FIG. 11 shows example pseudocode for implementing text extraction techniques in an illustrative embodiment.

FIG. 11 shows example pseudocode for implementing text extraction techniques in an illustrative embodiment. In this embodiment, example pseudocode 1100 is executed by or under the control of at least one processing system and/or device. For example, the example pseudocode 1100 may be viewed as comprising a portion of a software implementation of at least part of automated event-related data summarization system 105 of the FIG. 1 embodiment.

The example pseudocode 1100 illustrates importing Python-Tesseract, a python library that recognizes and reads text embedded in at least one image. Images that are typically captured by screen recorders can contain structured and unstructured data. Accordingly, techniques such as detailed in connection with FIG. 11 include analyzing an image and extracting at least a portion of the text contained therein, as well as presenting the textual content of the image that can be part of the summarized content for offline reading and/or on-demand playback. One or more embodiments include utilizing OCR techniques on the image, and in connection with structured data in and/or on the image, utilizing OCR techniques in conjunction with Python-Tesseract.

It is to be appreciated that this particular example pseudocode shows just one example implementation of text extraction techniques, and alternative implementations of the process can be used in other embodiments.

In connection with presentations, captured from a virtual event, containing images and/or videos which include unstructured text, one or more embodiments include utilizing computer vision techniques. Using at least one Mask R-CNN model, a type of CNN, in conjunction with OCR techniques, such an embodiment includes performing object detection, text object segmentation, and text extraction. As detailed in connection with FIG. 12, implementing a Mask R-CNN model includes creating boundary boxes around important areas in the image that includes text objects.

Figure 12:
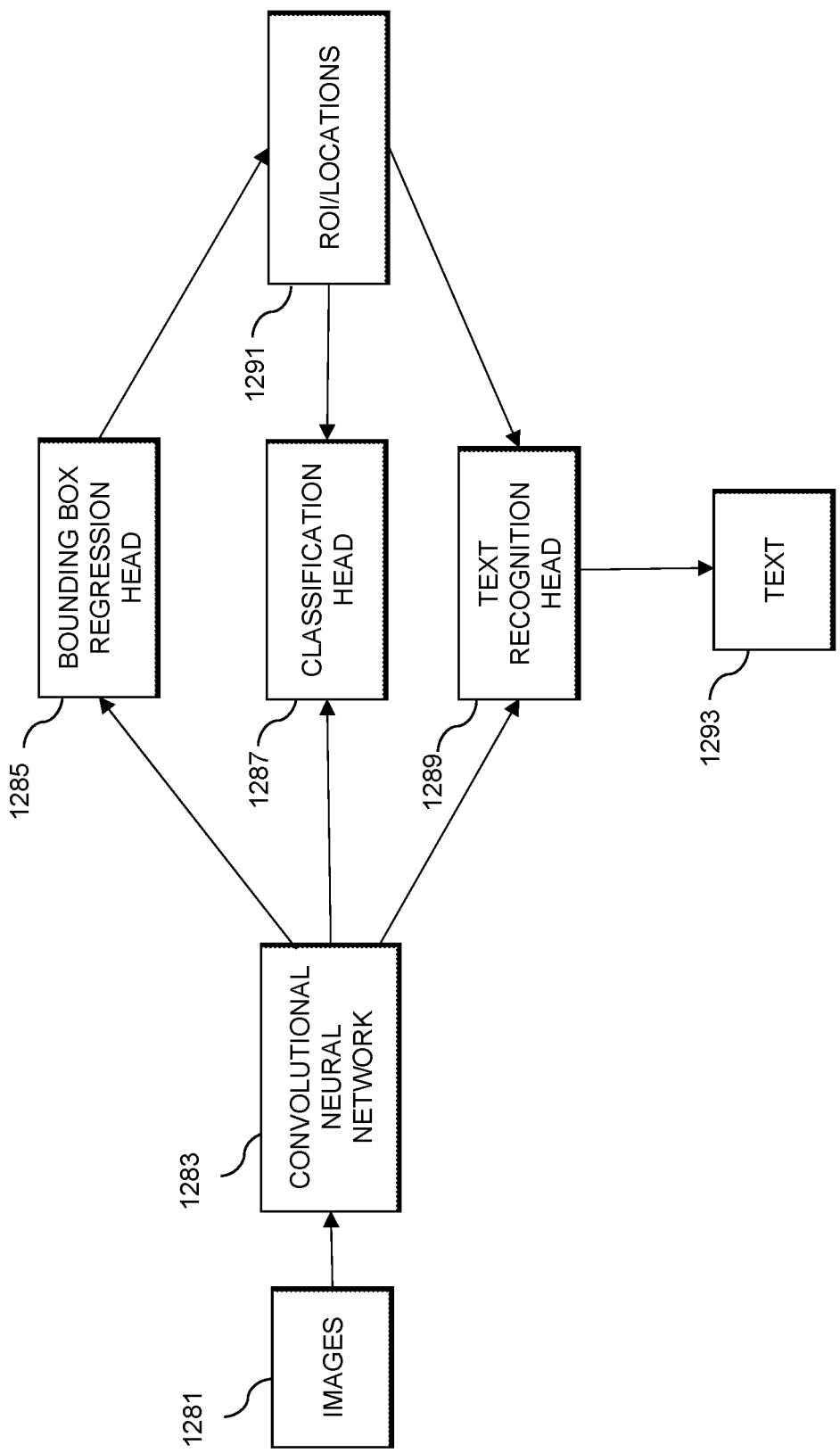
FIG. 12 shows an example workflow involving a convolutional neural network (CNN) in an illustrative embodiment.

FIG. 12 shows an example workflow involving a CNN in an illustrative embodiment. By way of illustration, FIG. 12 depicts images 1281 being provided to and/or processed by convolutional neural network 1283. In one or more embodiments, convolutional neural network 1283 includes a Mask R-CNN model. In such an embodiment, a Mask R-CNN model, being an object detection model, provides a flexible mechanism to identify at least one region of interest inside the images 1281. In connection with the images 1281, the Mask R-CNN model, in one or more embodiments, distinguishes between text objects and all other objects (i.e., non-text objects).

Additionally, in such an embodiment, the Mask R-CNN model can be trained and/or modified using OCR-related data, resulting in the model being able to identify one or more regions of interest (RoI) in an image that is highly likely to contain text, via a process referred to as text localization. In addition to text localization, the Mask R-CNN model can also read and/or extract text via a process referred to as text recognition. Also, in at least one embodiment, the Mask R-CNN model comprises a multi-task network (e.g., the model will predict multiple outputs from one single input image) to achieve both text localization and text recognition.

Referring again to the example embodiment depicted in FIG. 12, the convolutional neural network 1283 (e.g., Mask R-CNN model) includes three heads: a bounding box regression head 1285 which proposes boundary boxes that are likely to contain objects of interest, a classification head 1287 which classifies which type of objects (e.g., text, graphics, etc.) are contained in each bounding box, and a text recognition head 1289 which recognizes text 1293. In one or more embodiments, bounding box regression head 1285 can include text localization capabilities, including a two-stage mechanism with a region proposal network followed by a bounding box regression network. The output of bounding box regression head 1285 includes a list of RoI and/or locations 1291 (e.g., coordinates within the image(s)) in at least one of the images 1281 that might contain text. The classification head 1287 includes a classification component that estimates the class of object(s) inside the RoI and/or locations 1291 as text (versus non-text) via binary classification techniques. The text recognition head 1289 takes, as input, at least one feature map from convolutional neural network 1283 and the RoI and/or locations 1291 generated by bounding box regression head 1285.

Accordingly, as depicted in FIG. 12, in one or more embodiments, a multi-task network uses identified RoI and/or locations within at least one image, then fetches the relevant representations for each region from the convolutional backbone (e.g., the part of the convolutional neural network responsible for feature extraction). Such an embodiment can include using a simple convolutional method with short-range kernel width. At each spatial step, the output of at least one convolution is used to predict an output letter and the overall sequence is collapsed through a connectionist temporal classification (CTC) layer to output the final sequence for the Rot Such an embodiment includes an update and/or modification to a Mask R-CNN model, introducing text localization and recognition. Leveraging such a model and using labeled images for training, one or more embodiments include extracting text (from one or more images) with improved performance and efficiency over conventional OCR-based mechanisms.

As also detailed herein, one or more embodiments include translating a summarized message and/or content to one or more languages (e.g., the local language of the audience and/or user). Once the local language is configured by the user and/or determined automatically, the generated summarized content can be translated to that specific language using at least one language translation algorithm. In at least one embodiment, language translation includes a sequence-to-sequence modeling approach using NLP techniques. Additionally or alternatively, one or more embodiments can include using machine learning algorithms such as an encoder-decoder LSTM, and/or one or more transformers and corresponding libraries.

Figure 13:
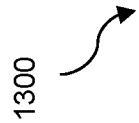
FIG. 13 shows example pseudocode for implementing language translation techniques in an illustrative embodiment.

FIG. 13 shows example pseudocode for implementing language translation techniques in an illustrative embodiment. In this embodiment, example pseudocode 1300 is executed by or under the control of at least one processing system and/or device. For example, the example pseudocode 1300 may be viewed as comprising a portion of a software implementation of at least part of automated event-related data summarization system 105 of the FIG. 1 embodiment.

The example pseudocode 1300 illustrates importing Google translator (googletrans), which uses transformers to translate texts to one or more languages, into a Python environment using a pip install command. Translated content, as further detailed herein, can be stored in a summarized content repository for future retrieval and/or playback by one or more users (e.g., on an on-demand basis).

It is to be appreciated that this particular example pseudocode shows just one example implementation of language translation techniques, and alternative implementations of the process can be used in other embodiments.

It is to be appreciated that a "model," as used herein, refers to an electronic digitally stored set of executable instructions and data values, associated with one another, which are capable of receiving and responding to a programmatic or other digital call, invocation, and/or request for resolution based upon specified input values, to yield one or more output values that can serve as the basis of computer-implemented recommendations, output data displays, machine control, etc. Persons of skill in the field may find it convenient to express models using mathematical equations, but that form of expression does not confine the model(s) disclosed herein to abstract concepts; instead, each model herein has a practical application in a processing device in the form of stored executable instructions and data that implement the model using the processing device.

Figure 14:
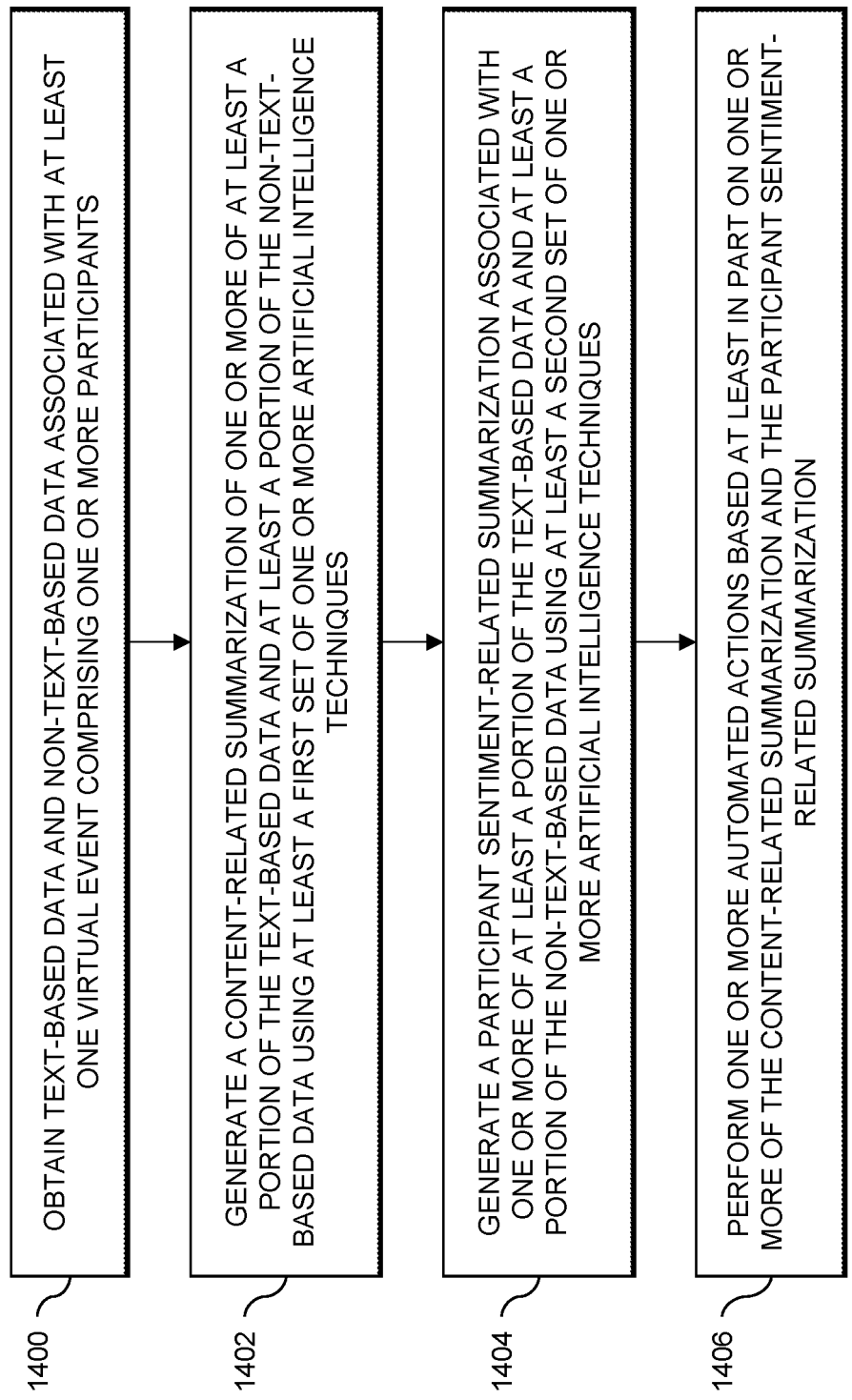
FIG. 14 is a flow diagram of a process for automatically summarizing event-related data using artificial intelligence techniques in an illustrative embodiment.

FIG. 14 is a flow diagram of a process for automatically summarizing event-related data using artificial intelligence techniques in an illustrative embodiment. It is to be understood that this particular process is only an example, and additional or alternative processes can be carried out in other embodiments.

In this embodiment, the process includes steps 1400 through 1406. These steps are assumed to be performed by automated event-related data summarization system 105 utilizing elements 112, 114, 116 and 118.

Step 1400 includes obtaining text-based data and non-text-based data associated with at least one virtual event comprising one or more participants.

Step 1402 includes generating a content-related summarization of one or more of at least a portion of the text-based data and at least a portion of the non-text-based data using at least a first set of one or more artificial intelligence techniques. In at least one embodiment, generating a content-related summarization includes processing one or more of the at least a portion of the text-based data and the at least a portion of the non-text-based data using one or more natural language processing techniques in connection with at least one artificial intelligence-based transformer. In such an embodiment, the at least one artificial intelligence-based transformer can include one or more of at least one BERT, at least one GPT, at least one GPT3, and at least one Huggingface transformer.

Additionally or alternatively, generating a content-related summarization can include processing the at least a portion of the text-based data using one or more of at least one artificial intelligence-based extractive summarization technique and at least one abstractive summarization technique, wherein the at least one artificial intelligence-based extractive summarization technique includes identifying and extracting one or more words from the at least a portion of the text-based data, and wherein the at least one abstractive summarization technique includes generating one or more phrases of text, not present in the at least a portion of the text-based data, using one or more natural language generation techniques.

Step 1404 includes generating a participant sentiment-related summarization associated with one or more of at least a portion of the text-based data and at least a portion of the non-text-based data using at least a second set of one or more artificial intelligence techniques. In one or more embodiments, generating a participant sentiment-related summarization includes processing, in conjunction with at least one domain-specific corpus, the at least a portion of the text-based data using at least one transformer-based sentiment classifier model.

Also, in at least one embodiment, generating a content-related summarization and/or generating a participant sentiment-related summarization can include converting at least a portion of the non-text-based data to text-based data using at least a portion of the first set of one or more artificial intelligence techniques. In such an embodiment, converting at least a portion of the non-text-based data to text-based data includes converting audio data to text data using at least one speech-to-text model comprising at least one convolutional neural network. Further, in such an embodiment, converting at least a portion of the non-text-based data to text-based data includes converting image data to text data using one or more computer vision techniques in connection with one or more optical character recognition techniques. Also, in one or more embodiments, the first set of one or more artificial intelligence techniques and the second set of one or more artificial intelligence techniques can include at least one identical artificial intelligence technique.

Step 1406 includes performing one or more automated actions based at least in part on one or more of the content-related summarization and the participant sentiment-related summarization. In at least one embodiment, performing one or more automated actions includes automatically translating one or more of the content-related summarization and the participant sentiment-related summarization into one or more predetermined languages using sequence-to-sequence modeling in connection with one or more natural language processing techniques. In such an embodiment, automatically translating one or more of the content-related summarization and the participant sentiment-related summarization into one or more predetermined languages using sequence-to-sequence modeling in connection with one or more natural language processing techniques includes using at least one encoder-decoder LSTM model.

Additionally or alternatively, performing one or more automated actions can include converting text data from one or more of the content-related summarization and the participant sentiment-related summarization to audio data using one or more text-to-speech techniques. Also, in one or more embodiments, performing one or more automated actions can include automatically training, using one or more of the content-related summarization and the participant sentiment-related summarization, at least a portion of one or more of the first set of one or more artificial intelligence techniques and the second set of one or more artificial intelligence techniques.

Accordingly, the particular processing operations and other functionality described in conjunction with the flow diagram of FIG. 14 are presented by way of illustrative example only, and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to automatically summarize event-related data using artificial intelligence techniques. These and other embodiments can effectively overcome problems associated with time-intensive and/or resource-intensive reviews of entire event recordings.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of Linux Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 15 and 16. Although described in the context of system 100, these platforms may also be used to implement at least portions of other information processing systems in other embodiments.

Figure 15:
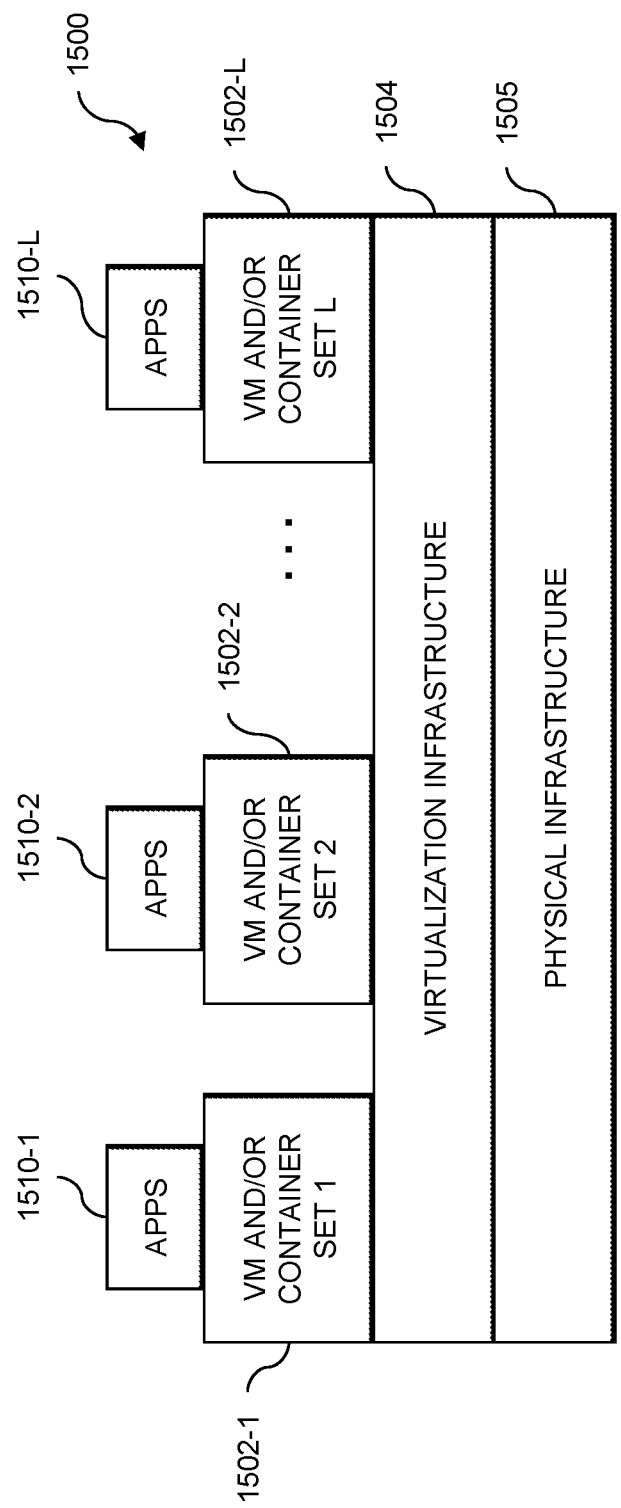
FIGS. 15 and 16 show examples of processing platforms that may be utilized to implement at least a portion of an information processing system in illustrative embodiments.

FIG. 15 shows an example processing platform comprising cloud infrastructure 1500. The cloud infrastructure 1500 comprises a combination of physical and virtual processing resources that are utilized to implement at least a portion of the information processing system 100. The cloud infrastructure 1500 comprises multiple virtual machines (VMs) and/or container sets 1502-1, 1502-2, . . . 1502-L implemented using virtualization infrastructure 1504. The virtualization infrastructure 1504 runs on physical infrastructure 1505, and illustratively comprises one or more hypervisors and/or operating system level virtualization infrastructure. The operating system level virtualization infrastructure illustratively comprises kernel control groups of a Linux operating system or other type of operating system.

The cloud infrastructure 1500 further comprises sets of applications 1510-1, 1510-2, . . . 1510-L running on respective ones of the VMs/container sets 1502-1, 1502-2, . . . 1502-L under the control of the virtualization infrastructure 1504. The VMs/container sets 1502 comprise respective VMs, respective sets of one or more containers, or respective sets of one or more containers running in VMs. In some implementations of the FIG. 15 embodiment, the VMs/container sets 1502 comprise respective VMs implemented using virtualization infrastructure 1504 that comprises at least one hypervisor.

A hypervisor platform may be used to implement a hypervisor within the virtualization infrastructure 1504, wherein the hypervisor platform has an associated virtual infrastructure management system. The underlying physical machines comprise one or more information processing platforms that include one or more storage systems.

In other implementations of the FIG. 15 embodiment, the VMs/container sets 1502 comprise respective containers implemented using virtualization infrastructure 1504 that provides operating system level virtualization functionality, such as support for Docker containers running on bare metal hosts, or Docker containers running on VMs. The containers are illustratively implemented using respective kernel control groups of the operating system.

Figure 16:
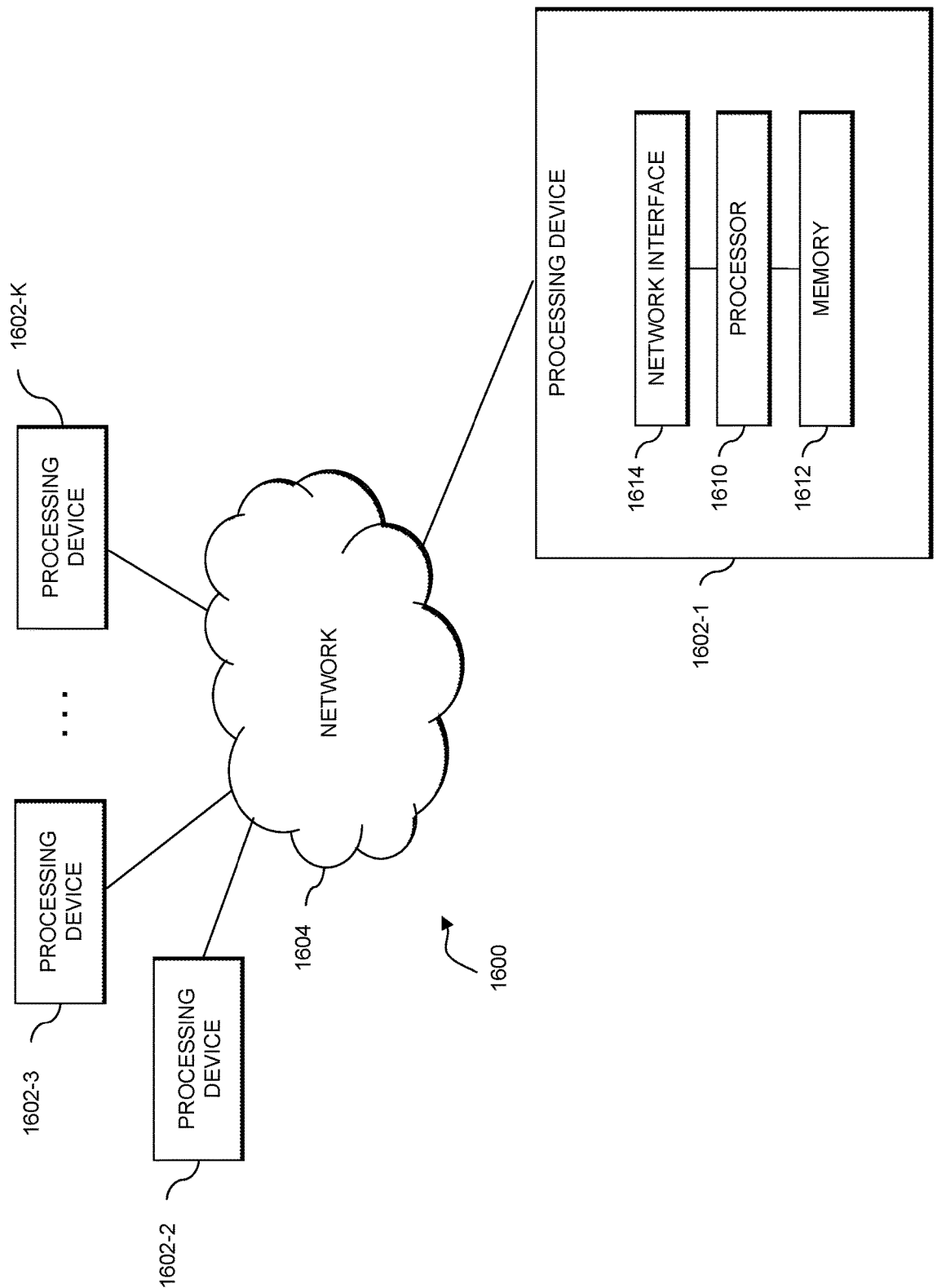

As is apparent from the above, one or more of the processing modules or other components of system 100 may each run on a computer, server, storage device or other processing platform element. A given such element is viewed as an example of what is more generally referred to herein as a "processing device." The cloud infrastructure 1500 shown in FIG. 15 may represent at least a portion of one processing platform. Another example of such a processing platform is processing platform 1600 shown in FIG. 16.

The processing platform 1600 in this embodiment comprises a portion of system 100 and includes a plurality of processing devices, denoted 1602-1, 1602-2, 1602-3, . . . 1602-K, which communicate with one another over a network 1604.

The network 1604 comprises any type of network, including by way of example a global computer network such as the Internet, a WAN, a LAN, a satellite network, a telephone or cable network, a cellular network, a wireless network such as a Wi-Fi or WiMAX network, or various portions or combinations of these and other types of networks.

The processing device 1602-1 in the processing platform 1600 comprises a processor 1610 coupled to a memory 1612.

The processor 1610 comprises a microprocessor, a CPU, a GPU, a TPU, a microcontroller, an ASIC, a FPGA or other type of processing circuitry, as well as portions or combinations of such circuitry elements.

The memory 1612 comprises random access memory (RAM), read-only memory (ROM) or other types of memory, in any combination. The memory 1612 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1602-1 is network interface circuitry 1614, which is used to interface the processing device with the network 1604 and other system components, and may comprise conventional transceivers.

The other processing devices 1602 of the processing platform 1600 are assumed to be configured in a manner similar to that shown for processing device 1602-1 in the figure.

Again, the particular processing platform 1600 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of an information processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
obtaining text-based data and non-text-based data associated with at least one virtual event comprising one or more participants, wherein obtaining text-based data and non-text-based data comprises converting at least a portion of the non-text-based data to at least a portion of the text-based data by converting at least a portion of at least one image, corresponding to presentation materials within the at least one virtual event, to text using at least one mask region-based convolutional neural network (mask R-CNN) model in connection with one or more segmentation techniques, wherein the at least one mask R-CNN model comprises a multi-task network trained to predict at least one text localization output and at least one text recognition output from a same portion of the at least one image;
generating a content-related summarization of one or more of at least a portion of the text-based data and at least a portion of the non-text-based data using at least a first set of one or more artificial intelligence techniques;
generating a participant sentiment-related summarization associated with one or more of at least a portion of the text-based data and at least a portion of the non-text-based data using at least a second set of one or more artificial intelligence techniques; and
performing one or more automated actions based at least in part on one or more of the content-related summarization and the participant sentiment-related summarization;
wherein the method is performed by at least one processing device comprising a processor coupled to a memory.

2. The computer-implemented method of claim 1, wherein generating a content-related summarization comprises processing one or more of the at least a portion of the text-based data and the at least a portion of the non-text-based data using one or more natural language processing techniques in connection with at least one artificial intelligence-based transformer.

3. The computer-implemented method of claim 2, wherein the at least one artificial intelligence-based transformer comprises one or more of at least one bidirectional encoder representation from transformers (BERT) and at least one generative pretrained transformer (GPT).

4. The computer-implemented method of claim 1, wherein generating a participant sentiment-related summarization comprises processing, in conjunction with at least one domain-specific corpus, the at least a portion of the text-based data using at least one transformer-based sentiment classifier model.

5. The computer-implemented method of claim 1, wherein performing one or more automated actions comprises automatically translating one or more of the content-related summarization and the participant sentiment-related summarization into one or more predetermined languages using sequence-to-sequence modeling in connection with one or more natural language processing techniques.

6. The computer-implemented method of claim 5, wherein automatically translating one or more of the content-related summarization and the participant sentiment-related summarization into one or more predetermined languages using sequence-to-sequence modeling in connection with one or more natural language processing techniques comprises using at least one encoder-decoder long short-term memory (LSTM) model.

7. The computer-implemented method of claim 1, wherein performing one or more automated actions comprises converting text data from one or more of the content-related summarization and the participant sentiment-related summarization to audio data using one or more text-to-speech techniques.

8. The computer-implemented method of claim 1, wherein generating a content-related summarization comprises processing the at least a portion of the text-based data using one or more of at least one artificial intelligence-based extractive summarization technique and at least one abstractive summarization technique, wherein using the at least one artificial intelligence-based extractive summarization technique comprises identifying and extracting one or more words from the at least a portion of the text-based data, and wherein using the at least one abstractive summarization technique comprises generating one or more phrases of text, not present in the at least a portion of the text-based data, using one or more natural language generation techniques.

9. The computer-implemented method of claim 1, wherein one or more of generating a content-related summarization and generating a participant sentiment-related summarization comprises converting at least a portion of the non-text-based data to text-based data using at least a portion of the first set of one or more artificial intelligence techniques.

10. The computer-implemented method of claim 9, wherein converting at least a portion of the non-text-based data to text-based data comprises converting audio data to text data using at least one speech-to-text model comprising at least one convolutional neural network.

11. The computer-implemented method of claim 9, wherein converting at least a portion of the non-text-based data to text-based data comprises converting image data to text data using one or more computer vision techniques in connection with one or more optical character recognition techniques.

12. The computer-implemented method of claim 1, wherein performing one or more automated actions comprises automatically training, using one or more of the content-related summarization and the participant sentiment-related summarization, at least a portion of one or more of the first set of one or more artificial intelligence techniques and the second set of one or more artificial intelligence techniques.

13. The computer-implemented method of claim 1, wherein the first set of one or more artificial intelligence techniques and the second set of one or more artificial intelligence techniques comprise at least one identical artificial intelligence technique.

14. A non-transitory processor-readable storage medium having stored therein program code of one or more software programs, wherein the program code when executed by at least one processing device causes the at least one processing device:
   to obtain text-based data and non-text-based data associated with at least one virtual event comprising one or more participants, wherein obtaining text-based data and non-text-based data comprises converting at least a portion of the non-text-based data to at least a portion of the text-based data by converting at least a portion of at least one image, corresponding to presentation materials within the at least one virtual event, to text using at least one mask region-based convolutional neural network (mask R-CNN) model in connection with one or more segmentation techniques, wherein the at least one mask R-CNN model comprises a multi-task network trained to predict at least one text localization output and at least one text recognition output from a same portion of the at least one image;
   to generate a content-related summarization of one or more of at least a portion of the text-based data and at least a portion of the non-text-based data using at least a first set of one or more artificial intelligence techniques;
   to generate a participant sentiment-related summarization associated with one or more of at least a portion of the text-based data and at least a portion of the non-text-based data using at least a second set of one or more artificial intelligence techniques; and
   to perform one or more automated actions based at least in part on one or more of the content-related summarization and the participant sentiment-related summarization.

15. The non-transitory processor-readable storage medium of claim 14, wherein generating a content-related summarization comprises processing one or more of the at least a portion of the text-based data and the at least a portion of the non-text-based data using one or more natural language processing techniques in connection with at least one artificial intelligence-based transformer.

16. The non-transitory processor-readable storage medium of claim 14, wherein generating a participant sentiment-related summarization comprises processing, in conjunction with at least one domain-specific corpus, the at least a portion of the text-based data using at least one transformer-based sentiment classifier model.

17. The non-transitory processor-readable storage medium of claim 14, wherein performing one or more automated actions comprises automatically translating one or more of the content-related summarization and the participant sentiment-related summarization into one or more predetermined languages using sequence-to-sequence modeling in connection with one or more natural language processing techniques.

18. An apparatus comprising:
   at least one processing device comprising a processor coupled to a memory;
   the at least one processing device being configured:
      to obtain text-based data and non-text-based data associated with at least one virtual event comprising one or more participants, wherein obtaining text-based data and non-text-based data comprises converting at least a portion of the non-text-based data to at least a portion of the text-based data by converting at least a portion of at least one image, corresponding to presentation materials within the at least one virtual event, to text using at least one mask region-based convolutional neural network (mask R-CNN) model in connection with one or more segmentation techniques, wherein the at least one mask R-CNN model comprises a multi-task network trained to predict at least one text localization output and at least one text recognition output from a same portion of the at least one image;
      to generate a content-related summarization of one or more of at least a portion of the text-based data and at least a portion of the non-text-based data using at least a first set of one or more artificial intelligence techniques;
      to generate a participant sentiment-related summarization associated with one or more of at least a portion of the text-based data and at least a portion of the non-text-based data using at least a second set of one or more artificial intelligence techniques; and
      to perform one or more automated actions based at least in part on one or more of the content-related summarization and the participant sentiment-related summarization.

19. The apparatus of claim 18, wherein generating a content-related summarization comprises processing one or more of the at least a portion of the text-based data and the at least a portion of the non-text-based data using one or more natural language processing techniques in connection with at least one artificial intelligence-based transformer.

20. The apparatus of claim 18, wherein generating a participant sentiment-related summarization comprises processing, in conjunction with at least one domain-specific corpus, the at least a portion of the text-based data using at least one transformer-based sentiment classifier model.

* * * * *